United States Patent [19]

Hearn et al.

[11] Patent Number: 5,779,883
[45] Date of Patent: Jul. 14, 1998

[54] HYDRODESULFURIZATION PROCESS UTILIZING A DISTILLATION COLUMN REALTOR

[75] Inventors: Dennis Hearn; Hugh M. Putman, both of Houston, Tex.

[73] Assignee: Catalytic Distillation Technologies, Pasadena, Tex.

[21] Appl. No.: 819,491

[22] Filed: Mar. 17, 1997

Related U.S. Application Data

[63] Continuation of Ser. No. 800,100, Jul. 10, 1995, abandoned.

[51] Int. Cl.$^6$ .................................................. C10G 45/02
[52] U.S. Cl. ..................... 208/213; 208/209; 203/28; 203/32
[58] Field of Search .................... 208/209, 213; 203/28, 32

[56] References Cited

U.S. PATENT DOCUMENTS

| | | | |
|---|---|---|---|
| 3,671,603 | 6/1972 | Hagemeyer et al. | 260/677 A |
| 3,699,036 | 10/1972 | Hass et al. | 208/111 |
| 3,884,984 | 5/1975 | Hirose et al. | 260/634 |
| 4,018,672 | 4/1977 | Moser | 208/216 R |
| 4,055,483 | 10/1977 | Mertzweiller et al. | 208/213 |
| 4,123,502 | 10/1978 | Hölter et al. | 423/230 |
| 4,194,964 | 3/1980 | Chen et al. | 208/108 |
| 4,213,847 | 7/1980 | Chen et al. | 203/28 |
| 4,232,177 | 11/1980 | Smith, Jr. | 203/28 |
| 4,731,229 | 3/1988 | Sperandio | 422/188 |
| 4,941,968 | 7/1990 | Reid | 208/236 |
| 5,009,770 | 4/1991 | Miller et al. | 208/209 |
| 5,073,236 | 12/1991 | Gelbein et al. | 203/29 |
| 5,084,259 | 1/1992 | Satek et al. | 423/277 |
| 5,124,027 | 6/1992 | Beaton et al. | 208/309 |
| 5,154,817 | 10/1992 | Reid | 208/48 AA |
| 5,173,173 | 12/1992 | Vauk | 208/213 |
| 5,266,546 | 11/1993 | Hearn | 502/300 |

OTHER PUBLICATIONS

Hobson, G.D., "Modern Petroleum Technology", pp. 363–371, Jun. 1973.

Primary Examiner—Walter D. Griffin
Attorney, Agent, or Firm—Kenneth H. Johnson

[57] ABSTRACT

A process for the hydrodesulfurization of petroleum streams is disclosed wherein the sulfur containing petroleum stream is contacted along with hydrogen at a partial pressure of less than 70 psig in a distillation column reactor containing a hydrodesulfurization catalyst in the form of a catalytic distillation structure.

17 Claims, No Drawings

HYDRODESULFURIZATION PROCESS UTILIZING A DISTILLATION COLUMN REALTOR

This application is a continuation of application Ser. No. 08/500,100, filed Jul. 10, 1995, now abandoned.

BACKGROUND OF THE INVENTION

1. Field of the Invention

The present invention relates to the hydrodesulfurization of petroleum streams in a distillation column reactor. More particularly the invention relates to a process wherein a petroleum fraction is fed to a distillation column reactor containing a hydrodesulfurization catalyst in the form of a catalytic distillation structure where the organic sulfur compounds contained in the petroleum fraction are reacted with hydrogen to form $H_2S$ which can be stripped from the overhead product.

2. Related Information

Petroleum distillate streams contain a variety of organic chemical components. Generally the streams are defined by their boiling ranges which determine the compositions. The processing of the streams also affects the composition. For instance, products from either catalytic cracking or thermal cracking processes contain high concentrations of olefinic materials as well as saturated (alkanes) materials and polyunsaturated materials (diolefins). Additionally, these components may be any of the various isomers of the compounds.

Organic sulfur compounds present in these petroleum fractions are denoted as, "sulfur". The amount of sulfur is generally dependent upon the crude source. For instance the Saudi Arabian crudes are generally high in sulfur as are certain domestic crudes. Kuwaiti, Libyan and Louisiana crudes are generally low in sulfur. The type of sulfur compounds will also depend on the boiling range of a given stream. Generally the lower boiling fractions contain mercaptans while the heavier boiling fractions contain thiophenic and heterocyclic sulfur compounds.

The organic sulfur compounds are almost always considered to be contaminants. They hinder in downstream processing and at the very least make obnoxious $SO_2$ gas when burned. For these reasons it is very desirable to remove these compounds. The degree of removal is dependent upon the use of the fraction. For instance, feed streams to catalytic reforming require extremely low sulfur concentrations (less than 1 wppm). Current EPA regulations call for combustible motor fuels such as gasoline, kerosene or diesel to have no more than about 500 wppm sulfur. It is expected that in the future the sulfur specification will be lowered to about 50 wppm, especially for gasoline.

The most common method of removal of the sulfur compounds is by hydrodesulfurization (HDS) in which the petroleum distillate is passed over a solid particulate catalyst comprising a hydrogenation metal supported on an alumina base. In the past this has generally been done by downflow over fixed beds concurrently with copious quantities of hydrogen in the feed. The following equations illustrate the reactions in a prior art typical HDS unit:

$RSH + H_2 \rightarrow RH + H_2S$  (1)

$RCl + H_2 \rightarrow RH + HCl$  (2)

$2RN + 4H_2 \rightarrow RH + NH_3$  (3)

$ROOH + 2H_2 \rightarrow RH + H_2O$  (4)

Additional reactions depend upon the sulfur compounds present and the source of the fraction. The catalyst used for hydrodesulfurization necessarily is a hydrogenation catalyst and the support sometimes is acidic in nature. The latter characteristics provide for some hydrocracking and hydrogenation of unsaturated compounds. The hydrocracking results in a higher volume of a less dense (lower specific gravity) material than the feed.

Typical operating conditions for the prior art HDS reactions are:

| | |
|---|---|
| Temperature, °F. | 600–780 |
| Pressure, psig | 600–3000 |
| $H_2$ recycle rate, SCF/bbl | 1500–3000 |
| Fresh $H_2$ makeup, SCF/bbl | 700–1000 |

After the hydrotreating is complete the product is fractionated or simply flashed to release the hydrogen sulfide and collect the now sweetened fraction.

It should be noted that the conditions or severity of the operation will depend upon the sulfur compounds present and the degree of desulfurization desired. For instance mercaptans are much more easily desulfurized than thiophenes. The desulfurization of thiophenes and other heterocyclic sulfur compounds necessarily involves breaking and saturation of the rings which requires higher severity.

A method of carrying out catalytic reactions has been developed wherein the components of the reaction system are concurrently separable by distillation using the catalyst structures as the distillation structures. Such systems are described variously in U.S. Pat. Nos. 4,215,011; 4,232,177; 4,242,530; 4,250,052; 4,302,356 and 4,307,254 commonly assigned herewith. In addition, commonly assigned U.S. Pat. Nos. 4,443,559, 5,057,468, 5,262,012, 5,266,546 and 5,348,710 disclose a variety of catalyst structures for this use and are incorporated by reference herein. A distillation column reactor has been utilized wherein a solid particulate catalyst has been placed within a distillation column so as to act as a distillation structure. The distillation column reactor has been found to be particularly useful in equilibrium limited reactions because the reaction products have been removed from the reaction zone almost immediately. Additionally the distillation column reactor has been found to be useful to prevent unwanted side reactions.

In U.S. Pat. No. 4,194,964, Chen, et al propose a process operated at about 300 psig to 3000 psig, high hydrogen partial pressures and high hydrogen flow rates (around 4000 SCF/B) for concurrent hydroprocessing and distillation of heavy petroleum stocks. Essentially Chen, et al disclose the use of concurrent distillation and hydroprocessing of the heavy stocks for the standard high pressure treating and hydrocracking. The range of conditions is fairly consistent with the prior art processes.

SUMMARY OF THE INVENTION

The present invention uses catalytic distillation in hydrodesulfurization at low total pressures below about 300 psig, preferably below about 290 and more preferably in the range of 0 to 200 psig, low hydrogen partial pressure in the range of 0.1 to less than 70 psi and temperatures in the range of 400° to 800° F. Briefly the invention may be said to comprise:

feeding (1) a petroleum stream containing sulfur compounds and (2) hydrogen to a distillation column reactor;

concurrently in said distillation column reactor (a) distilling said petroleum stream whereby there are vaporous petroleum products rising upward through said distillation column reactor, an internal reflux of liquid flowing downward in said distillation column reactor and condensing petroleum products within said distillation column reactor, (b) contacting said petroleum stream and said hydrogen in the presence of a hydrodesulfurization catalyst prepared in the form of a catalytic distillation structure at total pressure of less than about 300 psig, hydrogen partial pressure in the range of 0.1 to less than 70 psi and a temperature in the range of 400° to 800° F. whereby a portion of the sulfur compounds contained within said petroleum stream react with hydrogen to form $H_2S$;

withdrawing an overheads from said distillation column reactor containing said $H_2S$;

separating the $H_2S$ from said overheads by condensing a higher boiling fraction in a partial condenser;

returning a portion of said condensed overheads to said distillation column reactor as external reflux; and withdrawing a bottoms product having a lower sulfur content than said petroleum stream.

If required or desired the $H_2S$ may be stripped from the overhead product in a separate distillation column.

DESCRIPTION OF THE PREFERRED EMBODIMENTS

The operation of the distillation column reactor results in both a liquid and vapor phase within the distillation reaction zone. A considerable portion of the vapor is hydrogen while a portion is vaporous hydrocarbon from the petroleum fraction. Actual separation may only be a secondary consideration. Within the distillation reaction zone there is an internal reflux and liquid from an external reflux which cool the rising vaporous hydrocarbon condensing a portion within the bed.

Without limiting the scope of the invention it is proposed that the mechanism that produces the effectiveness of the present process is the condensation of a portion of the vapors in the reaction system, which occludes sufficient hydrogen in the condensed liquid to obtain the requisite intimate contact between the hydrogen and the sulfur compounds in the presence of the catalyst to result in their hydrogenation.

The result of the operation of the process in the catalytic distillation mode is that lower hydrogen partial pressures (and thus lower total pressures) may be used. As in any distillation there is a temperature gradient within the distillation column reactor. The temperature at the lower end of the column contains higher boiling material and thus is at a higher temperature than the upper end of the column. The lower boiling fraction, which contains more easily removable sulfur compounds, is subjected to lower temperatures at the top of the column which provides for greater selectivity, that is, less hydrocracking or saturation of desirable olefinic compounds. The higher boiling portion is subjected to higher temperatures in the lower end of the distillation column reactor to crack open the sulfur containing ring compounds and hydrogenate the sulfur.

It is believed that in the present reaction catalytic distillation is a benefit first, because the reaction is occurring concurrently with distillation, the initial reaction products and other stream components are removed from the reaction zone as quickly as possible reducing the likelihood of side reactions. Second, because all the components are boiling the temperature of reaction is controlled by the boiling point of the mixture at the system pressure. The heat of reaction simply creates more boil up, but no increase in temperature at a given pressure. As a result, a great deal of control over the rate of reaction and distribution of products can be achieved by regulating the system pressure. Also, adjusting the throughput (residence time=liquid hourly space velocity$^{-1}$) gives further control of product distribution and to a degree control of the side reactions such as oligomerization. A further benefit that this reaction may gain from catalytic distillation is the washing effect that the internal reflux provides to the catalyst thereby reducing polymer build up and coking.

Finally, the upward flowing hydrogen acts as a stripping agent to help remove the $H_2S$ which is produced in the distillation reaction zone.

Petroleum fractions which may be treated to remove sulfur by the instant process include the full range of petroleum distillates and include natural gas liquids, naphthas, kerosene, diesel, gas oils (both atmospheric and vacuum) and residuums. The fractions may be straight run material direct from a crude fractionation unit or may be the result of downstream processing, such as fluid catalytic cracking, pyrolysis or delayed coking.

The hydrogen rate to the reactor must be sufficient to maintain the reaction, but kept below that which would cause flooding of the column which is understood to be the "effectuating amount of hydrogen" as that term is used herein. The mole ratio of hydrogen to sulfur compound in the feed varies according to the type of compound and the amount of hydrogen expected to be consumed by side reactions such as double or triple bond saturation. Hydrogen flow rates are typically calculated as standard cubic feet per barrel of feed (SCFB) and are in the range of 300 to 3000 SCFB.

Surprisingly, a low total pressure, below about 300 psig, for example in the range of 0 to 200 psig is required for the hydrodesulfurization and hydrogen partial pressure of less than 70 psi down to 0.1 psig can be employed, e.g. 0.1 to 70 psig preferably about 0.5 to 10 psig. The preferred hydrogen partial pressure is less than 50 psig. This preferably is a hydrogen partial pressure in the range of about 0.1 to 10 psia and even more preferably no more than 7 psia. Optimal results have been obtained in the range between 0.5 and 50 psig hydrogen partial pressure.

Where the petroleum stream is a naphtha, typical conditions are overhead temperature in the range of 350° to 550° F., the bottoms temperature in the range of 500° to 800° F., and the pressure in the range of 25 to less than 300 psig. Where the petroleum stream is a kerosene, typical conditions are overhead temperature in the range of 350° to 650° F., the bottoms temperature in the range of 500° to 800° F., and the pressure in the range of 0 to 200 psig. Where the petroleum stream is a diesel, typical conditions are overhead temperature in the range of 350° to 650° F., the bottoms temperature in the range 500° to 850° F., and the pressure in the range 0 to 150 psig.

Catalyst which are useful for the hydrodesulfurization reaction include metals Group VIII such as cobalt, nickel, palladium, alone or in combination with other metals such as molybdenum or tungsten on a suitable support which may be alumina, silica-alumina, titania-zirconia or the like. Normally the metals are provided as the oxides of the metals supported on extrudates or spheres and as such are not generally useful as distillation structures.

The catalysts contain components from Group V, VIB, VIII metals of the Periodic Table or mixtures thereof. The use of the distillation system reduces the deactivation and provides for longer runs than the fixed bed hydrogenation units of the prior art. The Group VIII metal provides increased overall average activity. Catalysts containing a Group VIB metal such as molybdenum and a Group VIII such as cobalt or nickel are preferred. Catalysts suitable for the hydrodesulfurization reaction include cobalt-molybdenum, nickel-molybdenum and nickel-tungsten. The metals are generally present as oxides supported on a neutral base such as alumina, silica-alumina or the like. The metals are reduced to the sulfide either in use or prior to use by exposure to sulfur compound containing streams. The properties of a typical hydrodesulfurization catalyst in Table I below.

TABLE I

| Manufacture | Criterion Catalyst Co. |
|---|---|
| Designation | C-448 |
| Form | Tri-lobe Extrudate |
| Nominal size | 1.2 mm diameter |
| Metal, wt. % | |
| Cobalt | 2–5% |
| Molybdenum | 5–20% |
| Support | Alumina |

Broadly stated, the catalytic material is a component of a distillation system functioning as both a catalyst and distillation packing, i.e., a packing for a distillation column having both a distillation function and a catalytic function.

The reaction system can be described as heterogenous since the catalyst remains a distinct entity.

A preferred catalyst structure for the present hydrogenation reaction comprises flexible, semi-rigid open mesh tubular material, such as stainless steel wire mesh, filled with a particulate catalytic material in one of several embodiments recently developed in conjunction with the present process.

One new catalyst structure developed for use in hydrogenations is described in U.S Pat. No. 5,266,546 which is incorporated herein in its entirety. Briefly the new catalyst structure is a catalytic distillation structure comprising flexible, semi-rigid open mesh tubular material, such as stainless steel wire mesh, filled with a particulate catalytic material said tubular material having two ends and having a length in the range of from about one-half to twice the diameter of said tubular material, a first end being sealed together along a first axis to form a first seam and a second end being sealed together along a second axis to form a second seam wherein the plane of the first seam along the axis of said tubular material and the plane of the second seam along the axis of said tubular material bisect each other at an angle of about 15° to 90°.

U.S. Pat. No. 4,242,530 and U.S. Pat. No. 4,443,559 which are incorporated herein, disclose supported catalyst in a plurality of pockets in a cloth belt or wire mesh tubular structures, which is supported in the distillation column reactor by open mesh knitted stainless steel wire by twisting the two together into a helix. U.S. Pat. No. 5,348,710, which is incorporated herein, describes several other suitable structures in the prior art and discloses new structures suitable for this process. Other catalytic distillation structures useful for this purpose are disclosed in U.S. Pat. Nos. 4,731,229 and 5,073,236 which are also incorporated by reference.

The particulate catalyst material may be a powder, small irregular chunks or fragments, small beads and the like. The particular form of the catalytic material in the structure is not critical, so long as sufficient surface area is provided to allow a reasonable reaction rate. The sizing of catalyst particles can be best determined for each catalytic material (since the porosity or available internal surface area will vary for different material and of course affect the activity of the catalytic material).

For the present hydrodesulfurizations the preferred catalyst structures for the packing are those employing the more open structure of permeable plates or screen wire.

EXAMPLES

In the examples 1–3 below a catalyst structure was prepared as disclosed in U.S. Pat No. 5,431,890, which is incorporated herein, containing 0.947 pounds of the catalytic material described in Table I and placed in the middle nineteen feet of a 20 foot tall 1 inch diameter distillation column reactor. There were ½ foot of inert packing in a rectifying section above the catalyst and ½ foot of inert packing in a stripping section below the catalyst. Liquid feed was fed to the distillation column reactor at either at about the mid point or below the catalyst bed and hydrogen was fed at the bottom of the catalyst bed. In each of the examples there is a showing of a substantial reduction in the amount of organic sulfur in both the overheads and bottoms, the removed organic sulfur that has been converted to $H_2S$ and separated overhead by partial condensation of the overheads.

Example 1

A full boiling range naphtha was fed to the distillation column reactor containing a the catalyst prepared as noted above. Conditions and results are given in TABLE II below.

TABLE II

| Run No. | 4_25HDS |
|---|---|
| Hours | 605.2 |
| Feed | |
| rate, lbs/hr | 1.00 |
| total sulfur, wppm (mg) | 925 (419) |
| $H_2$-rate, SCFH (SCFB) | 11.03 (3243) |
| Temperature, °F. | |
| Overhead | 364 |
| Top Catalyst Bed | 503 |
| Mid Catalyst Bed | 514 |
| Bottom Catalyst Bed | 580 |
| Bottoms | 679 |
| Feed | 401 |
| Total Pressure, psig | 200 |
| Hydrogen Partial pressure, psig | 23.9 |
| Overhead | |
| rate, lbs/hr | 0.74 |
| total sulfur, wppm (mg) | 120 (40) |
| Bottoms | |
| rate, lbs/hr | 0.20 |
| total sulfur, wppm (mg) | 203 (18) |
| Reflux Ratio | 10:1 |
| Catalyst above feed, feet | 9 |
| Catalyst below feed, feet | 10 |
| Conversion of organic S, % | 86 |

Example 2

A kerosene fraction was fed to the distillation column reactor described above. Conditions and results are given in TABLE III below.

TABLE III

| Run No. | 4_25HDS |
|---|---|
| Hours | 1757.2 |
| Feed | |
| rate, lbs/hr | 1.00 |
| total sulfur, wppm (mg) | 1528 (694) |
| $H_2$ rate, SCFH (SCFB) | 5.02 (1476) |
| Temperature, °F. | |
| Overheads | 449 |
| Top Catalyst Bed | 647 |
| Mid Catalyst Bed | 659 |
| Bottom Catalyst Bed | 697 |
| Bottoms | 784 |
| Feed | 450 |
| Total Pressure, psig | 100 |
| Hydrogen Partial Pressure, psig | 11 |
| Overhead | |
| rate, lbs/hr | 0.81 |
| total sulfur, wppm (mg) | 38 (14) |
| Bottoms | |
| rate, lbs/hr | 0.17 |
| total sulfur, wppm (mg) | 1577 (122) |
| Reflux Ratio | 10:1 |
| Catalyst above feed, feet | 19 |
| Catalyst below feed, feet | 0 |
| Conversion of organic S, % | 80 |

Example 3

A diesel fraction was fed to the distillation column reactor as described above. Conditions and results are given in TABLE IV below.

TABLE IV

| Run No. | 4_25HDS |
|---|---|
| Hours | 1421.2 |
| Feed | |
| rate, lbs/hr | 1.00 |
| total sulfur, wppm (mg) | 1528 (694) |
| $H_2$ rate, SCFH (SCFB) | 10.03 (2949) |
| Temperature, °F. | |
| Overheads | 438 |
| Top Catalyst Bed | 634 |
| Mid Catalyst Bed | 648 |
| Bottom Catalyst Bed | 689 |
| Bottoms | 801 |
| Feed | 450 |
| Total Pressure, psig | 100 |
| Hydrogen Partial Pressure, psig | 23 |
| Overhead | |
| rate, lbs/hr | 0.77 |
| total sulfur, wppm (mg) | 84 (29) |
| Bottoms | |
| rate, lbs/hr | 0.21 |
| total sulfur, wppm (mg) | 1278 (122) |
| Reflux Ratio | 10:1 |
| Catalyst above feed, feet | 19 |
| Catalyst below feed, feet | 0 |
| Conversion of organic S, % | 78 |

Example 4

In the following example 18.7 pounds of the catalytic material of Table I were placed in the catalytic distillation structure prepared as disclosed in U.S. Pat No. 5,431,890, and were placed in the mid 40 feet of a fifty foot tall three inch distillation column reactor. Liquid feed was to about two thirds of the way up the column and hydrogen was fed below the bed. A second full range fluid cracked naphtha was feed to the column and the conditions and results are reported in TABLE V below.

TABLE V

| Run No. | 1027HDS |
|---|---|
| Hours | 308 |
| Feed | |
| rate, lbs/hr | 20.0 |
| total sulfur, wppm (mg) | 1242 (11,277) |
| $H_2$ rate, SCFH (SCFB) | 41 (601) |
| Temperature, °F. | |
| Overheads | 476 |
| Top Catalyst Bed | 552 |
| Mid Catalyst Bed | 651 |
| Bottom Catalyst Bed | 696 |
| Bottoms | 749 |
| Feed | 297 |
| Total Pressure, psig | 200 |
| Hydrogen Partial Pressure, psig | 21.23 |
| Overhead | |
| rate, lbs/hr | 16.0 |
| total sulfur, wppm (mg) | 122 (886) |
| Bottoms | |
| rate, lbs/hr | 4.0 |
| total sulfur, wppm (mg) | 35 (64) |
| Reflux Ratio | 4:1 |
| Internal Reflux | 6.02 |
| Catalyst above feed, feet | 15 |
| Catalyst below feed, feet | 25 |
| Conversion of organic S, % | 92 |

The invention claimed is:

1. A process for the hydrodesulfurization of petroleum streams comprising:

(A) feeding (1) a petroleum stream containing organic sulfur compounds and (2) hydrogen to a distillation column reactor;

(B) concurrently in said distillation column reactor (1) distilling said petroleum stream whereby there are vaporous petroleum products rising upward through said distillation column reactor, an internal reflux of liquid flowing downward in said distillation column reactor and condensing petroleum products within said distillation column reactor, and (2) contacting said petroleum stream and said hydrogen in the presence of a hydrodesulfurization catalytic distillation structure at total pressure less than about 300 psig, hydrogen partial pressure in the range of 0.1 to less than 70 psi and a temperature in the range of 400° to 800° F. whereby a portion of the organic sulfur compounds contained within said petroleum stream react with hydrogen to form $H_2S$;

(C) withdrawing an overheads from said distillation column reactor containing said $H_2S$;

(D) separating the $H_2S$ from said overheads by condensing a higher boiling fraction of said overheads;

(E) returning a portion of said condensed higher boiling fraction of said overheads to said distillation column reactor as external reflux; and (F) withdrawing a bottoms product having a lower sulfur content than said petroleum stream.

2. The process according to claim 1 wherein the total pressure is below about 290 psig.

3. The process according to claim 1 wherein the total pressure is in the range of 0 to 200 psig.

4. The process according to claim 1 wherein the $H_2S$ is separated from said overheads by condensing the higher boiling fraction in a partial condenser and removing said $H_2S$ as a gas along with any unreacted hydrogen.

5. The process according to claim 4 wherein all of said condensed higher boiling fraction of said overheads is returned to said distillation column reactor as external reflux.

6. The process according to claim 1 wherein said petroleum stream is a naphtha.

7. The process according to claim 6 wherein the temperature of said overheads is in the range of 350° to 550° F., the temperature of said bottoms product is in the range of 500° to 800° F., the total pressure is in the range of 25 to less than 300 psig, and the hydrogen partial pressure is less than 30 psia.

8. The process according to claim 1 wherein said petroleum stream is a kerosene.

9. The process according to claim 8 wherein the temperature of said overheads is in the range of 350° to 650° F., the temperature of said bottoms product is in the range of 500° to 800° F., the total pressure is in the range of 0 to 200 psig, and the hydrogen partial pressure is less than 20 psia.

10. The process according to claim 1 wherein said petroleum stream is a diesel.

11. The process according to claim 10 wherein the temperature of said overheads is in the range of 350° to 650° F., the temperature of said bottoms product is in the range 500° to 850° F., the total pressure is in the range 0 to 150 psig, and the hydrogen partial pressure is less than 20 psia.

12. The process according to claim 1 wherein a portion of said bottoms product is heated in a reboiler and returned to said distillation column reactor.

13. The process according to claim 1 wherein all of said bottoms product is heated in a reboiler and returned to said distillation column reactor.

14. The process according to claim 1 wherein the $H_2S$ is removed from said overheads by stripping in a separate distillation column.

15. The process according to claim 1 wherein said hydrodesulfurization catalytic distillation structure comprises cobalt-molybdenum.

16. The process according to claim 1 wherein said hydrodesulfurization catalytic distillation structure comprises nickel-molybdenum.

17. The process according to claim 1 wherein said hydrodesulfurization catalytic distillation structure comprises nickel-tungsten.

* * * * *